United States Patent [19]
Shah

[11] Patent Number: 5,706,420
[45] Date of Patent: Jan. 6, 1998

[54] SUPER PIPELINED SPECULATIVE EXECUTION VECTOR GENERATOR

[75] Inventor: Monish S. Shah, Fort Collins, Colo.

[73] Assignee: Hewlett-Packard Company, Palo Alto, Calif.

[21] Appl. No.: 468,608

[22] Filed: Jun. 6, 1995

[51] Int. Cl.[6] ............................................. G06F 7/38
[52] U.S. Cl. ........................ 395/143; 364/786; 364/736
[58] Field of Search ............................ 395/143, 121, 395/122; 364/757, 758, 788, 786, 787, 736

[56] References Cited

U.S. PATENT DOCUMENTS

| | | | |
|---|---|---|---|
| 5,025,405 | 6/1991 | Swanson | 364/723 |
| 5,128,892 | 7/1992 | Ullrich | 364/786 |
| 5,157,388 | 10/1992 | Kohn | 340/800 |
| 5,272,662 | 12/1993 | Scriber et al. | 364/788 |
| 5,280,571 | 1/1994 | Keith et al. | 395/143 |
| 5,309,553 | 5/1994 | Mukai et al. | 395/143 |
| 5,457,646 | 10/1995 | Jang et al. | 364/757 |
| 5,471,414 | 11/1995 | Kumar et al. | 364/788 |
| 5,476,559 | 12/1995 | Makino | 364/758 |
| 5,477,480 | 12/1995 | Inui | 364/787 |

OTHER PUBLICATIONS

"Algorithm For Computer Control Of A Digital Plotter" J.E. Bresenham, IBM Systems Journal, vol. 4, No. 1, 1965.

*Primary Examiner*—Joseph H. Feild
*Attorney, Agent, or Firm*—Augustus W. Winfield

[57] ABSTRACT

A circuit and method for iterative generation of the variables used in vector generation and linear interpolation. Most significant bits are added in a last pipeline stage. Less significant bits are added in earlier pipeline stages. Breaking addition into multiple parts with each part having fewer bits to add enables a faster iterative cycle rate compared to a single long adder. Part of the vector generation algorithm requires a decision step based on the sign of the complete addition. Since this sign is generated in the last stage of the pipeline, it is not available at the time needed by earlier stages of the pipeline. Therefore, all possible combinations of outcomes for earlier pipeline stages are simultaneously speculatively computed for use by following pipeline stages.

4 Claims, 8 Drawing Sheets

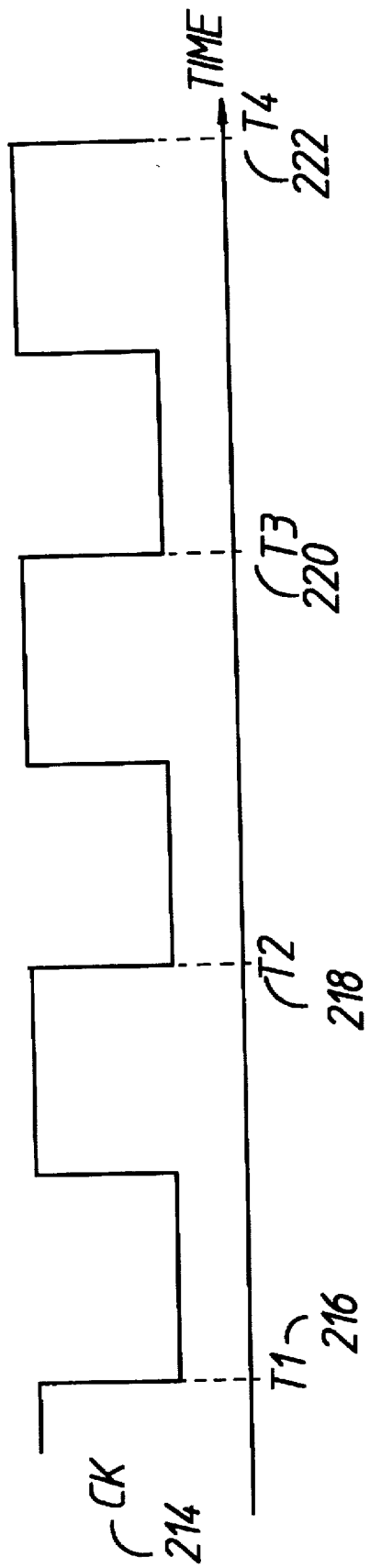

5,706,420

SUPER PIPELINED SPECULATIVE EXECUTION VECTOR GENERATOR

FIELD OF INVENTION

This invention relates generally to computer graphics and more specifically to specialized hardware for vector generation and linear interpolation.

BACKGROUND OF THE INVENTION

Linear interpolation and vector generation are fundamental procedures used throughout computer graphics, for example, in line drawing, computation of polygon edges, texture mapping, image scaling and shading. Since the use of linear interpolation and vector generation is so pervasive in computer graphics, speed is very important. Graphics processors often use some variation of a classic algorithm published by Bresenham in 1965 (Bresenham, J. E., "Algorithm for Computer Control of a Digital Plotter", *IBM Systems Journal*, vol. 4, No. 1, 1965, pp. 25–30). The Bresenham algorithm eliminates the need for relatively slow floating point arithmetic (especially multiply and divide functions), and instead reduces the computations for straight lines to relatively fast integer addition and integer compare functions. The basic Bresenham algorithm requires a single set of initial computations followed by multiple iterations of a loop, each loop iteration requiring a test, a branch, two add instructions and overhead for the loop. Numerous improvements of the basic Bresenham algorithm have been disclosed for software implementations and for hardware implementations. For example, if multiple values are computed for each iteration of a loop, the loop overhead is reduced. U.S. Pat. No. 5,025,405 (Swanson) discloses a pipelined hardware system in which pairs of additions are simultaneously computed in one stage of a pipeline for use at the next stage in the pipeline. U.S. Pat. No. 5,280,571 discloses a multi-processor system in which lines are divided into segments, each segment having N points, each point computed by one of N processors. There is an ongoing need for further improvement in speed.

SUMMARY OF THE INVENTION

The invention is a hardware vector generator with reduced time required for addition. Addition time is decreased by reducing the bit length of hardware adders. Addition is pipelined, with least significant bits being computed in a first stage and more significant bits being computed in downstream pipeline stages. The vector generation algorithm requires a decision step based on the sign of the completed addition. Since this sign is generated in the final stage of the pipeline, it is not available at the time needed by earlier stages of the pipeline. Therefore, for each stage except the last, all possible alternatives are simultaneously speculatively computed for use by the next stage.

BRIEF DESCRIPTION OF THE DRAWINGS

FIG. 2B is a timing diagram for the circuit of FIG. 2A.

DETAILED DESCRIPTION OF THE PREFERRED EMBODIMENT OF THE INVENTION

Consider a vector having a starting point $(X_0,Y_0)$ and an end point $(X_1,Y_1)$. For one directional octant, the basic Bresenham algorithm is as follows:

$dx=X_1-X_0$ $dy=Y_1-Y_0$ $I1=2*dy$ $I2=2*(dy-dx)$ $d=2*dy-dx$ $x=X_0$ $y=Y_0$ write (x, y, value)

for $X=X_0$ to $X_1$ if d<=0 then d=d+I1; x=x+1;

else d=d+I2;x=x+1; y=y+1;

write (x, y, value)

next X.

From the above, it can be seen that the inner loop of the Bresenham algorithm requires a simple adder to increment a direction variable "x", a simple adder to conditionally increment a direction variable "y", and an adder combined with a decision capability to compute a decision variable "d". The invention is concerned with decreasing the time required for each of these three adders, but in particular, is concerned with decreasing the time required for computation of the decision variable "d".

Figure 1A:
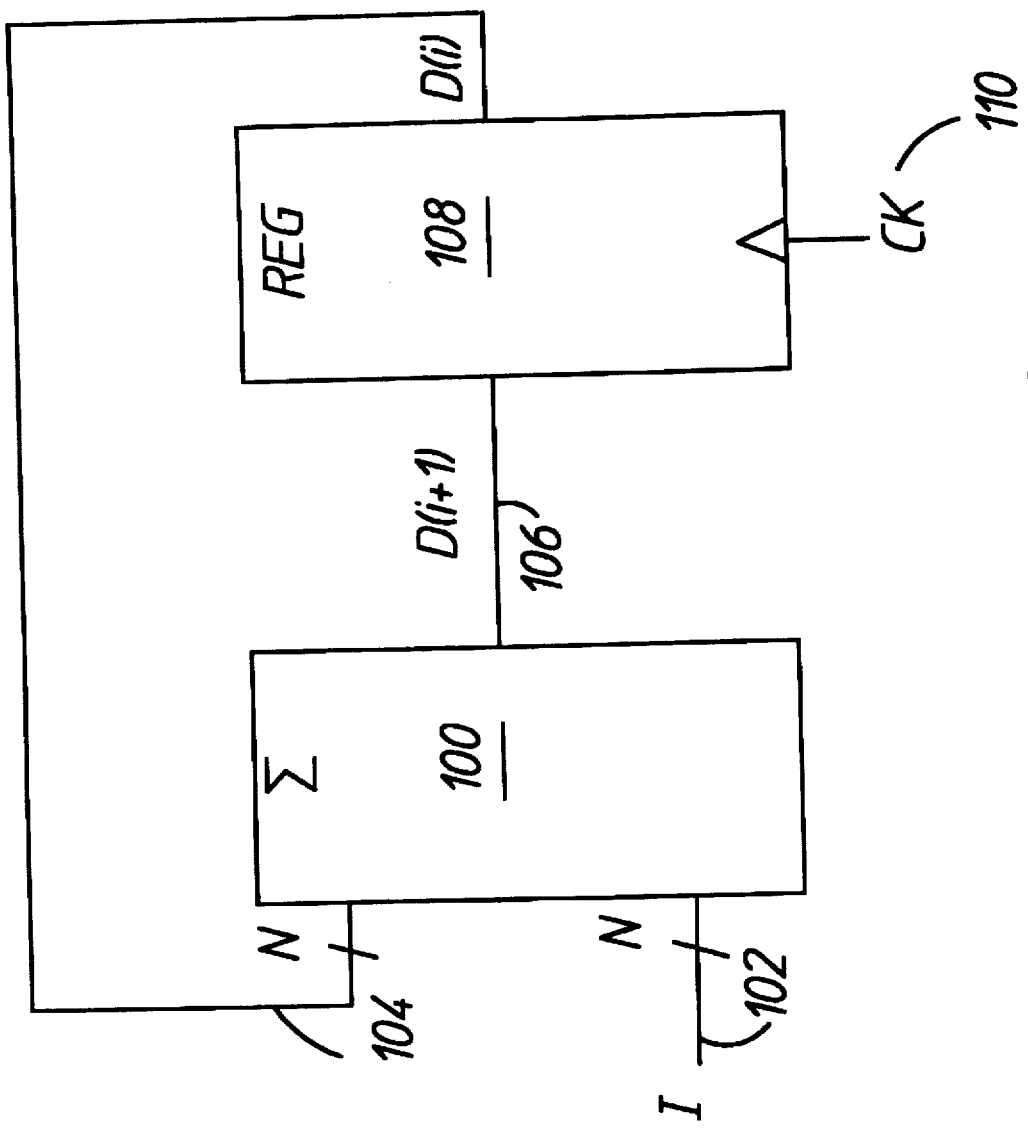
FIG. 1A is a block diagram illustrating a simplified iterative addition circuit.
Figure 1B:
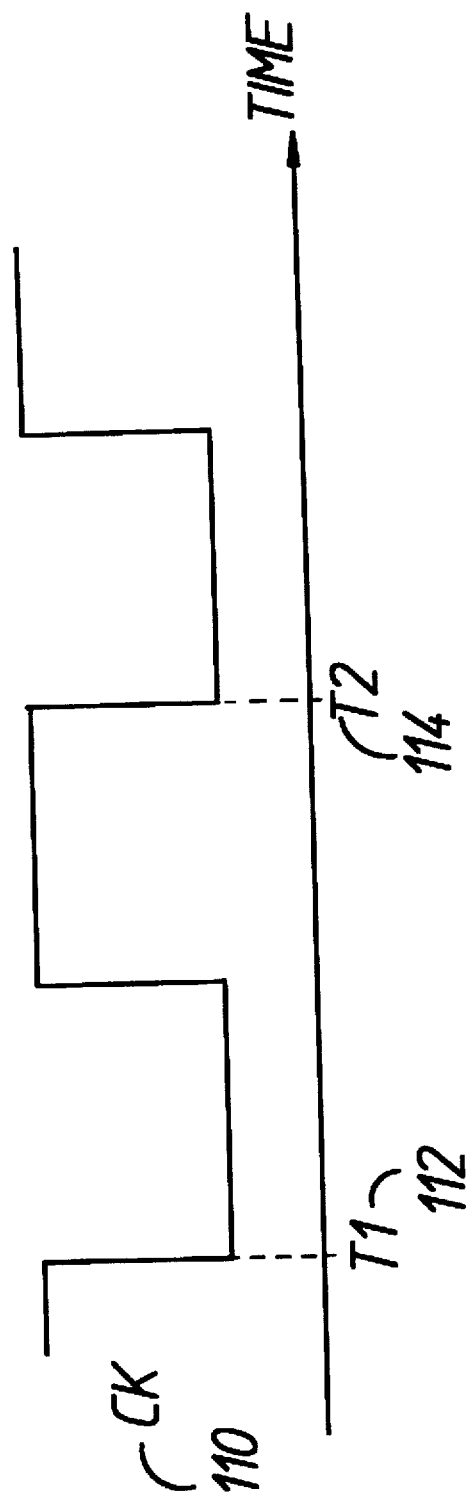
FIG. 1B is a timing diagram for the circuit of FIG. 1A.
Figure 2A:
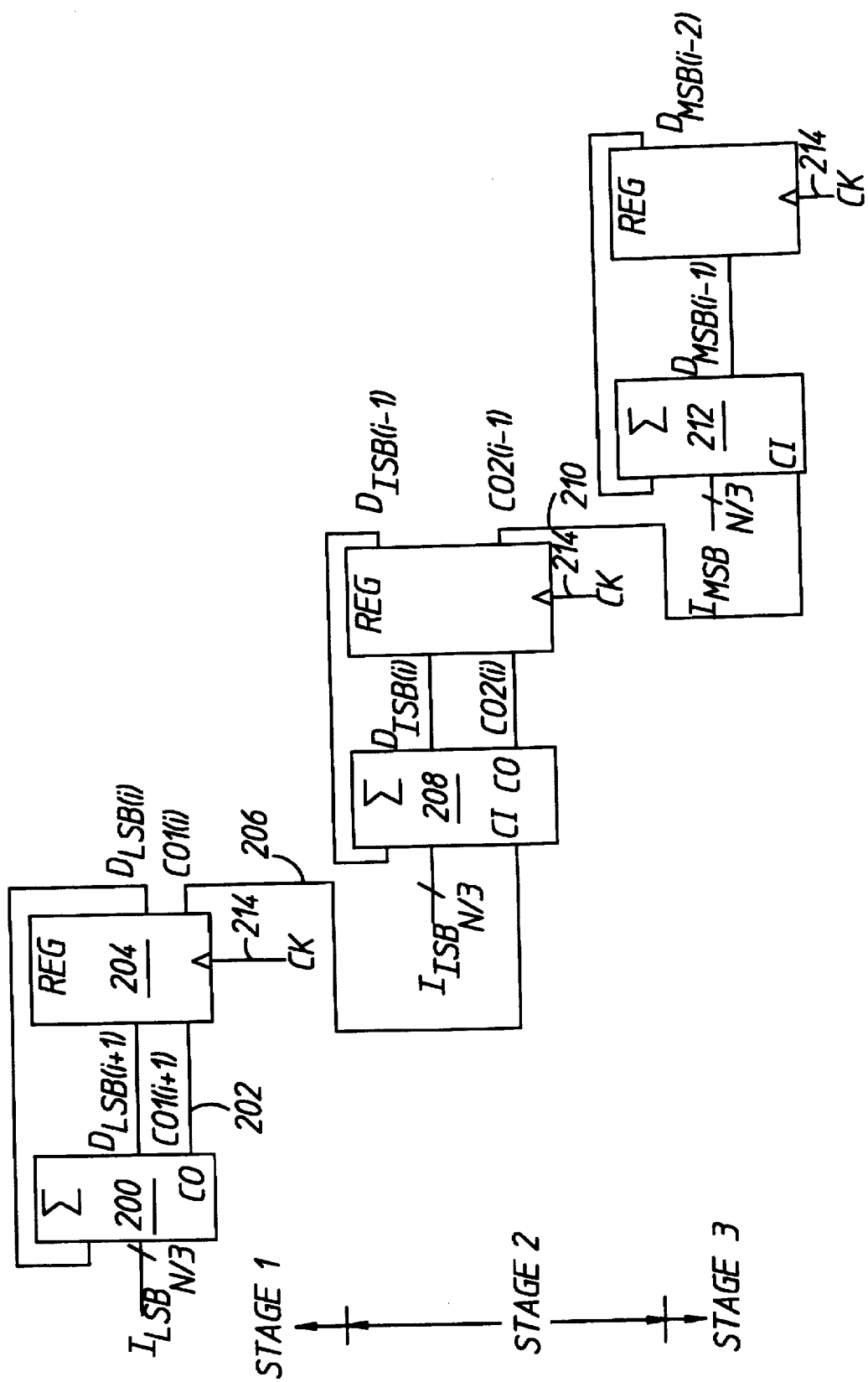
FIG. 2A is a block diagram of a three stage pipelined iterative addition circuit with shorter bit length adders.
Figure 4A:
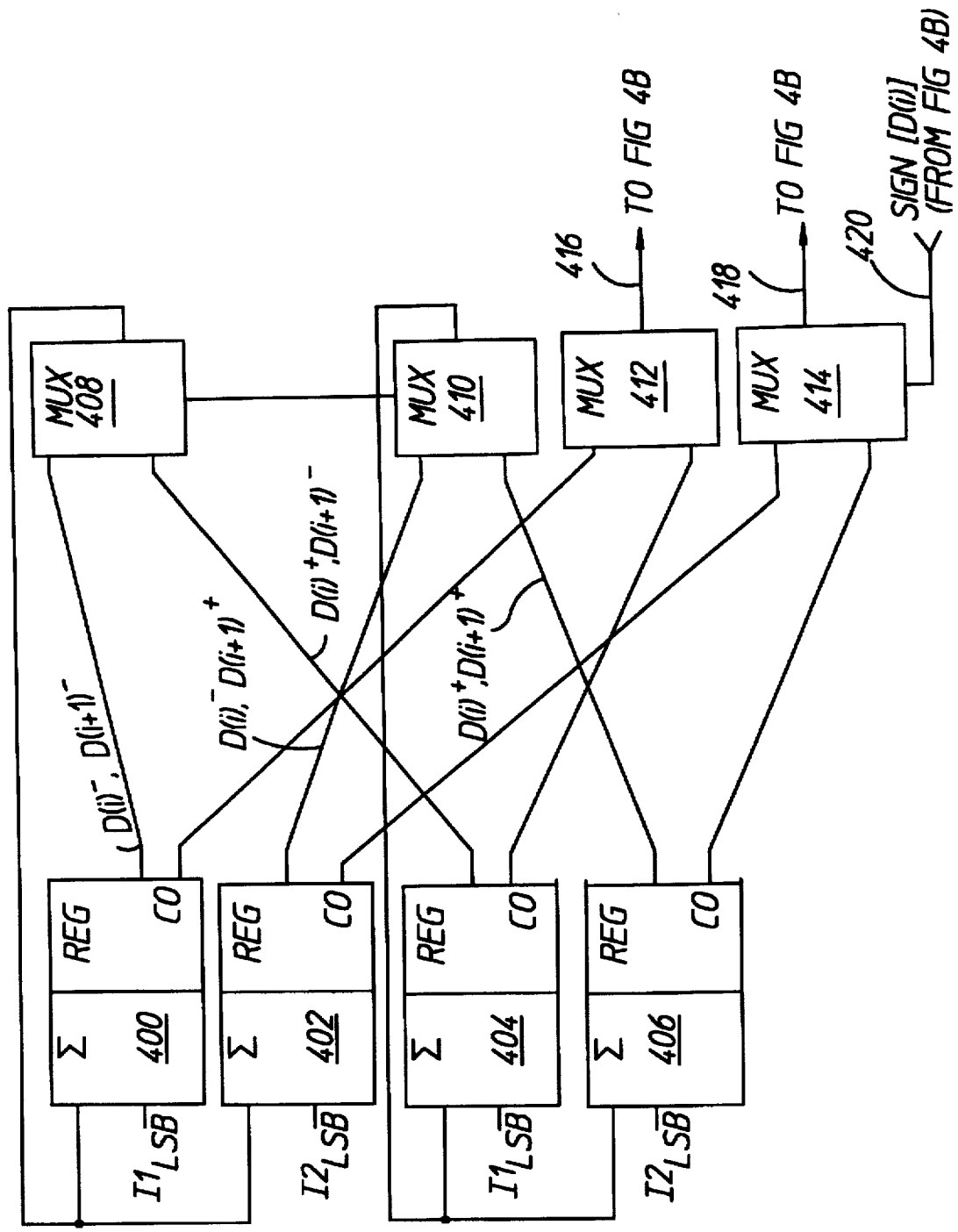
FIG. 4A is a block diagram of the first stage of a three stage pipelined vector generator circuit with simultaneous speculative addition in the first two stages.
Figure 4B:
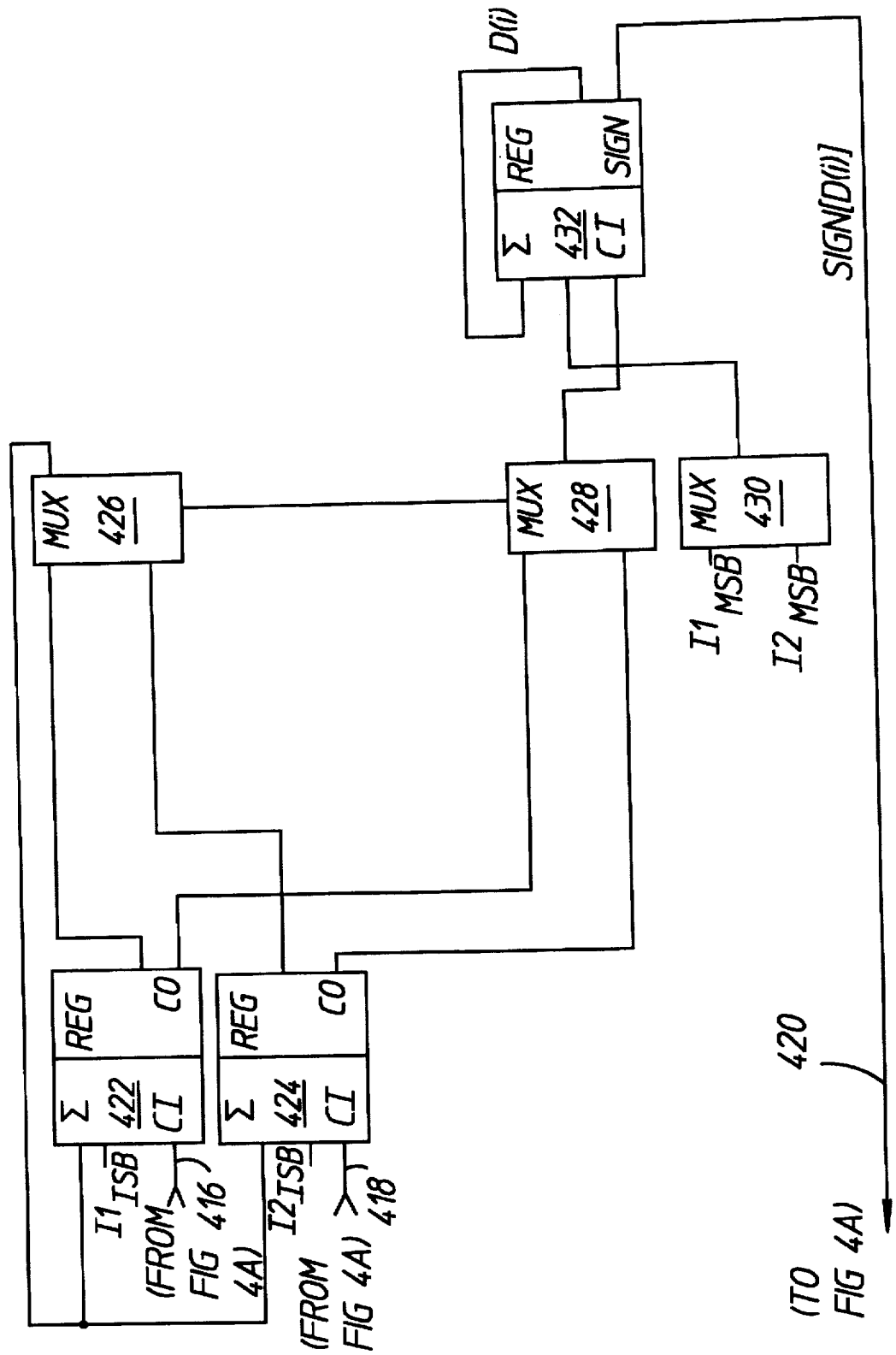
FIG. 4B is a block diagram of the last two stages of the pipelined vector generator of FIG. 4A.
Figure 5:
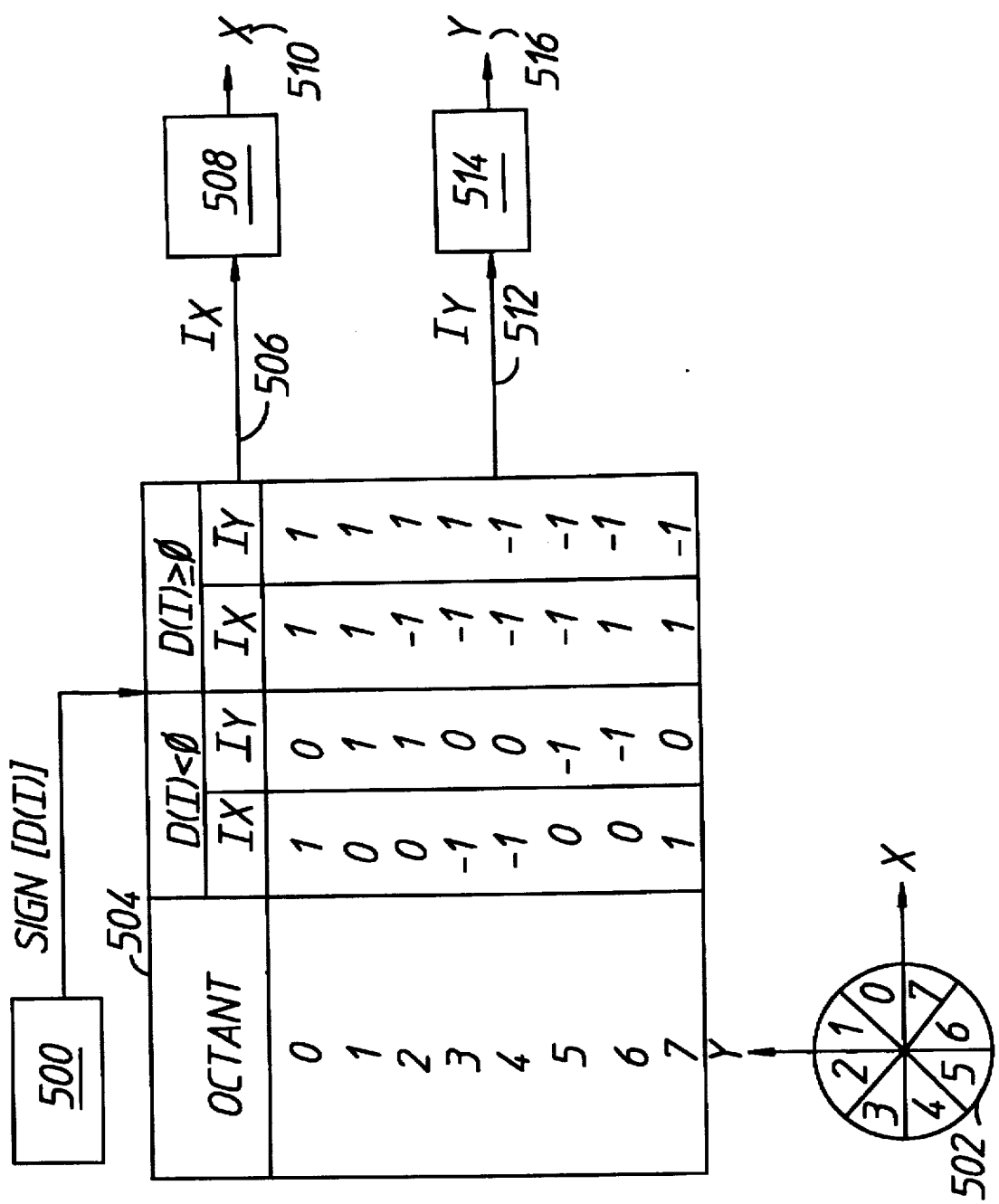
FIG. 5 is a block diagram of a complete two-dimensional vector generator.

In the following description, the final generalized circuit is derived from a series of less complex circuits in building block fashion. First, FIGS. 1A and 1B illustrate a simple iterative add circuit for discussion of the fundamental time limitation that is improved by the invention. Then, FIGS. 2A and 2B illustrate a three-stage pipelined version of the iterative add circuit for discussion of the reduction in iteration time with shorter bit length adders. The circuit of FIGS. 2A and 2B may be used for the variables "x" and "y" in the Bresenham algorithm. Next, in FIG. 3, an iterative non-pipelined vector generator section for computing the decision variable "d" is presented. FIGS. 4A and 4B illustrate an example embodiment of a pipelined vector generator section for computing the decision variable "d". The example embodiment in FIGS. 4A and 4B has a three stage pipeline and has simultaneous speculative computation in the first two stages. Finally, FIG. 5 illustrates a complete two dimensional vector generator.

FIG. 1A illustrates a simple iterative addition circuit. In FIG. 1A, "T" is a constant and "D" is a variable. "D" is both an output and an input. At each falling clock edge, the circuit computes D(i+1)=D(i)+I, where D(i) is the old value of D and D(i+1) is the new value of D. An N-bit adder circuit 100 has two inputs, "T" (102) and D(i) (104). The output of the adder, D(i+1) (106) is latched into a register 108 at the next falling edge of a clock CK (110) and then the cycle repeats.

FIG. 1B illustrates a timing diagram for the clock signal CK (110). One iteration of D, for example D(i), is completed at T1 (112) and the next iteration D(i+1) is completed at T2 (114). The time interval T2-T1 is limited primarily by the time required for N carry bits to ripple through the adder 100 (FIG. 1A). Adder 100 may be viewed as N adders, each adding two input bits and generating an output bit and a carry bit. The overall output of adder 100 is not ready until the carry bit of the least significant bit has rippled all the way through to the most significant bits. There are numerous designs for speeding addition, but in general, for any particular design, the time required for addition increases with the number of bits being added. One approach to speed improvement then is to break the adder into smaller pieces and pipeline the various smaller pieces.

FIG. 2A illustrates the N-bit iterative adder of FIG. 1A implemented as three N/3-bit adders in a three stage pipeline. A first N/3-bit adder 200 adds the N/3 least significant bits of I and D. One output of adder 200 is a carry-out bit CO1 (202) that is latched by register 204 along with D and provided as a latched carry-out bit 206. A second N/3-bit adder 208 receives the latched carry-out bit 206 as a carry-in input and adds the N/3 intermediate significant bits of I and D plus the latched carry-out bit 206. Finally, a third N/3-bit adder 212 adds the N/3 most significant bits of I and D plus the latched carry out bit 210 of the intermediate stage. The circuit of FIG. 2A can be used for the adders for incrementing "x" and "y" in a vector generator using the Bresenham algorithm.

FIG. 2B illustrates a timing diagram for the circuit of FIG. 2A. The notation of "i-2, i-1, i, i+1" refers to any one fixed point in time, for example, time T1 (216) in the following discussion. At time T1 (216), adder 200 starts computing the least significant bits of D(i+z1). At time T1 (216), the first stage latched carry output bit CO1(i) (206) is available to the second stage adder 208. At time T1 (216), the second stage latched carry output bit CO2(i-1) is available to the third stage adder 212. Therefore, at T1, adder 200 starts computing $D_{LSB}$(i+1) in stage 1 of the pipeline, simultaneously adder 208 starts computing $D_{LSB}$(i) in stage 2 of the pipeline, and simultaneously, adder 212 starts computing $D_{MSB}$(i-1) in stage 3 of the pipeline. When starting from an initial condition, adder 200 starts an addition at time T1 that is not completed until after time T3. Two clock cycles after an initial condition, the third stage adder 212 completes a new iteration of D during each cycle of clock CK (214). The minimum iteration cycle time T2 (218) minus T1 (216) for FIGS. 2A–2B is less than the minimum iteration cycle time T2–T1 for FIGS. 1A–1B because each adder in FIG. 2A has an internal carry ripple for only N/3 bits whereas each adder in FIG. 1A has an internal carry ripple of N bits. Therefore, for any given total number N of added bits, the clock frequency for the adder configuration of FIG. 2A can be higher than the clock frequency for the adder configuration of FIGS. 1A.

Figure 3:
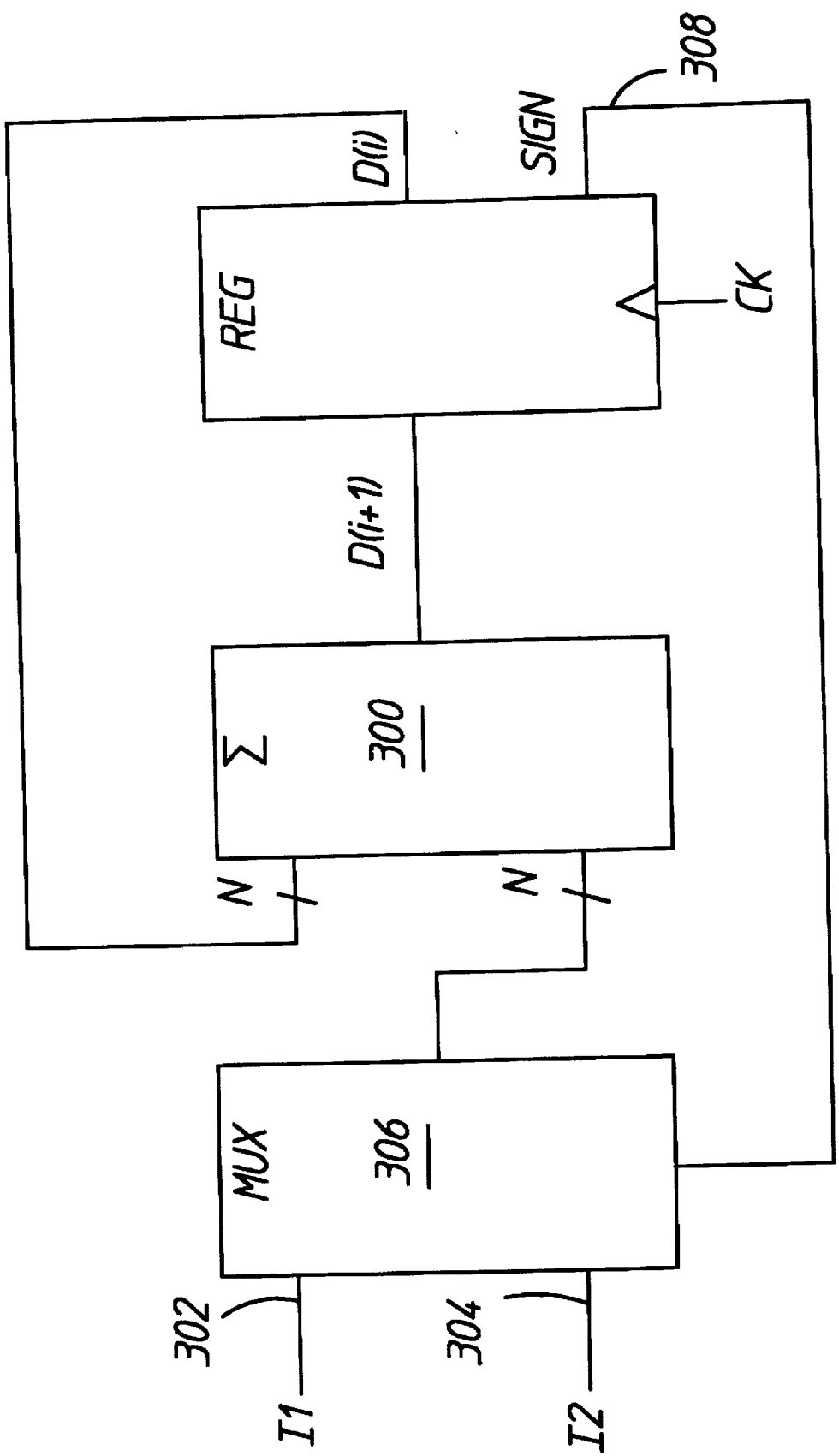
FIG. 3 is a block diagram of a basic vector generator circuit without pipelining.

FIG. 3 illustrates an embodiment of a circuit for iterative computation of the variable "d" in the Bresenham algorithm. In FIG. 3, adder 300 adds either constant I1 (302) or constant I2 (304) to the previous value of "d" (D(i)). The sign 308 of D(i) controls a digital multiplexer 306. Multiplexer 306 presents I1 (302) to the adder 300 if the sign 308 of D(i) is negative (logical ONE) and presents I2 (304) if the sign 308 is positive.

Consider the circuit of FIG. 3 used in a multiple stage pipeline as illustrated in FIG. 2A. Consider the pipeline starting from an initial condition and consider only the least significant bits. For the first clock cycle, D(0) is known and the sign of D(0) is available to determine whether I1 or I2 is needed for the least significant bits of D(1). However, for the second clock cycle (T2–T3 in FIG. 2B), the sign of D(1) is needed but the most significant bits and sign of D(1) will not available until later. For a two stage pipeline, the sign of D(1) will be latched and available at the beginning of the third clock cycle, and for a three stage pipeline, the sign of D(1) will be latched and available at the beginning of the fourth clock cycle (for example, at T4 (222) in FIG. 2B) and so forth. In the two stage example, the solution in the invention for the lack of availability of the sign variable when needed is to speculatively add the least significant bits of both I1 and I2 to the least significant bits of D(i-1) in the first stage and have both sums and carry bits available to the second stage at the time the sign of D(i) is ready for selection.

Now, assume for illustration that the pipeline has more than two stages. At the beginning of the third clock cycle (for example, at T3 (220) in FIG. 2B), the sign of D(2) is needed and D(2) will not be available until later. For three stages, the solution in the invention is to speculatively add the least significant bits of both I1 and I2 to each of the two speculative results computed during the second clock cycle and have the resulting four sums and carry bits available at the time the sign of D(2) is available for selection. For a three stage pipeline as illustrated in FIG. 2A, the sign of D(1) is available at the beginning of the fourth clock cycle so that the four speculative results computed in the third clock cycle can be reduced to two speculative results (waiting on the availability of the sign of D(2)). Then during the fourth clock cycle, four speculative results are again computed awaiting the sign of D(3) and so forth.

FIG. 4A illustrates the first stage of a three stage pipelined vector generator circuit with simultaneous speculative addition. As illustrated, there are four adders (400, 402, 404, 406) in the first stage. The summation output and carry output of adder 400 are for the condition where D(i) is negative and D(i+1) is negative. The summation output and carry output of adder 402 are for the condition where D(i) is negative and D(i+1) is positive. The summation output and carry output of adder 404 are for the condition where D(i) is positive and D(i+1) is negative. The summation output and carry output of adder 406 are for the condition where D(i) is positive and D(i+1) is positive. Consider one particular failing clock edge, at which time D(i) is latched and the sign 420 of D(i) is available, but the sign of D(i+1) is still not available. Multiplexers 408 and 410 are controlled by the sign 420 of D(i). If D(i) is negative, multiplexer 408 selects from the two adders corresponding to negative D(i+1) (adders 400 & 404) the adder corresponding to negative D(i) (adder 400) and multiplexer 410 selects from the two adders corresponding to positive D(i+1) (adders 402 and 406) the adder corresponding to negative D(i) (adder 402). If D(i) is positive, multiplexer 408 selects from the two adders corresponding to negative D(i+1) (adders 400 & 404) the adder corresponding to positive D(i) (adder 404) and multiplexer 410 selects from the two adders corresponding to positive D(i+1) (adders 402 and 406) the adder corresponding to positive D(i) (adder 406). Similarly, the sign of D(i) is used to control multiplexers 412 and 414 for selection of the appropriate pair of carry output bits (416 and 418) to provide to the next pipeline stage.

FIG. 4B illustrates the last two stages of the three stage pipeline. Adders 422 and 424 simultaneously speculatively add intermediate significant bits of both I1 and I2 and the speculative carry output bits from the previous pipeline stage. One latched previous state is selected by multiplexer 426 as controlled by the sign of D(i). Similarly, one carry output bit is selected by multiplexer 428 for use by the last pipeline stage. Finally, multiplexer 430 and adder 432 in the last pipeline stage compute the most significant bits in a circuit arrangement that is equivalent to the single stage circuit of FIG. 3 with the addition of a carry input bit.

In FIGS. 2A, 4A and 4B, the choice of three pipeline stages is arbitrary and is used only for illustration. In general, the number of pipeline stages can be anywhere in the range from 2 to N where N is the number of bits in the variable "d" in the Bresenham algorithm. Note that for an M stage pipeline, the first stage will have $2^{M-1}$ adders, the second stage $2^{M-2}$ adders and so forth with the last stage having one ($2^0$) adder. Note that FIG. 4B represents the last two stages, regardless of the number of stages.

Finally, for a complete pipelined vector generator using the Bresenham algorithm in accordance with the invention, a pipeline circuit as in FIGS. 4A and 4B is used to generate a sign bit that is used to control a first circuit as in FIG. 2A for incrementing "x" and a second circuit as in FIG. 2A for incrementing "y". For "x" and "y", the constant "I" in FIG. 2A is the value one (or negative one) or zero (for an axis).

FIG. 5 illustrates a complete two dimensional vector generator. Note that the specific version of the Bresenham algorithm listed above is valid for only one directional octant. For directional octants as defined in circle 502 in FIG. 5, the specific algorithm listed above is valid only for octant "0". For that one octant, "x" is incremented every clock cycle and "y" is incremented only if D(i) is positive. Variations of the algorithm for the remaining octants are given in table 504 in FIG. 5. Circuit 500 in FIG. 5 depicts a multi-stage pipeline circuit as illustrated in FIGS. 4A and 4B. The sign of D(i) and the directional octant determine an "$I_x$" value 506 for circuit 508 and an "$I_y$" value 512 for circuit 514. Circuits 508 and 514 are multi-stage pipeline circuits as illustrated in FIG. 2A. Circuit 508 generates incremental values of variable "x" (510). Circuit 514 generates incremental values of variable "y" (516).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A circuit for iterative generation of a decision variable used in vector generation, the decision variable comprising most significant bits, less significant bits and a sign bit, the circuit comprising:

at least two pipeline stages, one of the pipeline stages being a last pipeline stage and another one of the pipeline stages being a next-to-last pipeline stage;

an adder in the last pipeline stage, receiving a carry input bit, adding the most significant bits and generating the sign bit as an output;

two adders in the next-to-last pipeline stage, receiving the less significant bits and generating two speculative carry output bits; and the sign bit from the last pipeline stage being used to select one of the two speculative carry output bits of the next-to-last pipeline stage to be received as the carry input bit for the last pipeline stage.

2. The circuit of claim 1, further comprising:

the two adders in the next-to-last pipeline stage generating two speculative alternatives of the less significant bits; and the sign bit from the last pipeline stage being used to select one of the two speculative alternatives of the less significant bits for use as inputs by the next-to-last pipeline stage for a next iteration.

3. A method of computing a decision variable used in iterative vector generation, the decision variable comprising a sign bit, most significant bits and less significant bits, the method comprising the following steps:

generating the most significant bits and the sign bit in a last pipeline stage;

receiving a carry input bit by the last pipeline stage;

generating first and second speculative carry bits in a next-to-last pipeline stage;

using the sign bit from the last pipeline stage to determine which of the first and second speculative carry bits from the next-to-last pipeline stage is received as the carry input bit by the last pipeline stage.

4. The method of claim 3, further comprising the following steps:

generating speculative alternatives of the less significant bits in the next-to-last pipeline stage; and using the sign bit from the last pipeline stage to determine which of the speculative alternatives of the less significant bits are used as inputs by the next-to-last pipeline stage for a next iteration.

* * * * *